C. Lent
Hay & Cotton-Press.
N° 74,703. Patented Feb. 18, 1868.
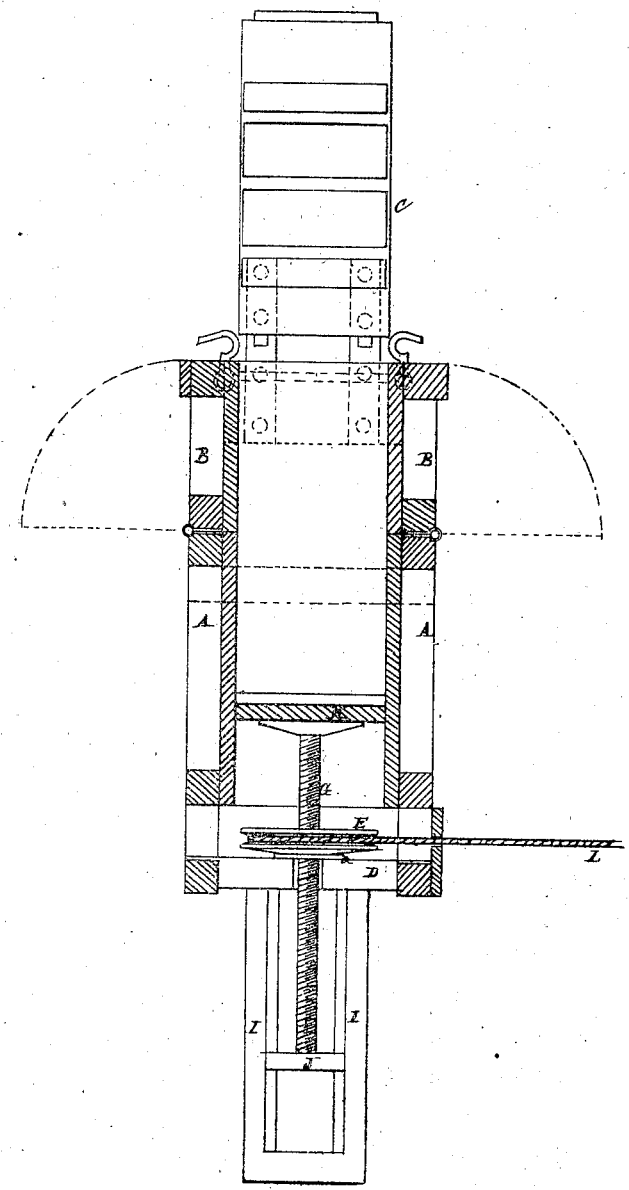

United States Patent Office.

C. LENT, OF WASHINGTON CITY, DISTRICT OF COLUMBIA.

Letters Patent No. 74,703, dated February 18, 1868.

IMPROVEMENT IN HAY AND COTTON-PRESSES.

The Schedule referred to in these Letters Patent and making part of the same.

TO ALL WHOM IT MAY CONCERN:

Be it known that I, C. LENT, of Washington, in the county of Washington, and in the District of Columbia, have invented new and useful Improvements in Hay and Cotton-Presses, and do hereby declare that the following is a full, clear, and exact description thereof, reference being had to the accompanying drawings, and to the letters of reference marked thereon.

In the annexed drawings, making part of this specification, A represents a press-box, made of any suitable material and size, and in a very solid, substantial manner. This box, when in position to be used, stands vertically. C represents a door, which opens or closes the upper end of the box. B B represent two doors, which are hinged upon two sides of the box at its upper end, and through either of the ways which these doors close the bale of hay or straw may be removed from the press-box. Below the box, and running crosswise of the frame which surrounds and supports said box, is a cross-tie, D, which has secured upon its upper side a plate, $a$. An opening is made through the cross-tie and the plate to admit the vertical screw-shaft G. This shaft has secured to its upper end the follow-block H, and to its lower end the cross-head J, while surrounding it is the pulley-nut E. The nut E is suitably bevelled on its under face, and rests upon the plate $a$. A cord, L, passes around the nut E for the purpose of giving it a rotary motion. When the nut E is rotated in one direction, the shaft G, with its follow-block, is raised, but when rotated in the opposite direction, it descends. I I represent two frame-pieces, which project some distance below the main frame of the press, being framed into the cross-piece D at their upper ends, and connected by a suitable cross-bar at their lower ends. Formed in the inner sides of these pieces I I are grooves, into which the ends of the cross-head J take. When the screw-shaft G moves up and down, this cross-head slides in the grooves in the pieces I I, said grooves forming guides for the lower end of the shaft.

In using this press, the follower H is lowered to the bottom of the press-box, and then said box is filled with hay or straw through the doorway in the upper end. After a sufficient quantity of hay has been placed in the box, the door C is closed down and firmly secured. Power is now applied to one end of cord L, and the nut E is rotated in that direction, which elevates the screw-shaft. The follow-block H presses the hay in the box into a bale in the upper end of said box, where it may be tied or secured in any of the usual ways, and then removed through one of the doors at B. As soon as the bale is removed, power is applied to the other end of the rope, and the turning of the nut E in an opposite direction causes the shaft and follow-block to descend to the bottom of the box again. The box is again filled with hay or straw, and the operation of pressing it upward into bale is again performed, as before. One horse attached to the end of the cord L will press hay in this manner with great rapidity and great power. The pieces I I may be sunk beneath the floor of the building in which the machine is placed, or when the machine is in the open air a pit may be made to receive them.

Having thus fully described my invention, what I claim as new, and desire to secure by Letters Patent, is—

The arrangement of the press-box, as constructed with the shaft G, provided with follow-block H and cross-head J, nut E, cross-tie D, plate $a$, and guide-pieces I I, the several parts being connected and used substantially as and for the purpose set forth.

In testimony that I claim the foregoing, I have hereunto set my hand, this 22d day of January, 1868.

C. LENT.

Witnesses:
V. D. STOCKBRIDGE,
A. A. YEATMAN.